(12) United States Patent
Nguyen

(10) Patent No.: US 7,979,677 B2
(45) Date of Patent: Jul. 12, 2011

(54) ADAPTIVE ALLOCATION OF RESERVATION STATION ENTRIES TO AN INSTRUCTION SET WITH VARIABLE OPERANDS IN A MICROPROCESSOR

(75) Inventor: Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 11/833,561

(22) Filed: Aug. 3, 2007

(65) Prior Publication Data

US 2009/0037698 A1 Feb. 5, 2009

(51) Int. Cl.
G06F 9/30 (2006.01)
G06F 9/38 (2006.01)
(52) U.S. Cl. ............... 712/214; 712/215; 712/217
(58) Field of Classification Search ............... 712/214, 712/215, 217
See application file for complete search history.

(56) References Cited

U.S. PATENT DOCUMENTS

| | | | | |
|---|---|---|---|---|
| 4,797,849 A | * | 1/1989 | Nakano ............... | 708/654 |
| 5,210,834 A | * | 5/1993 | Zurawski et al. ............. | 712/207 |
| 5,870,582 A | * | 2/1999 | Cheong et al. ............. | 712/218 |
| 5,974,524 A | * | 10/1999 | Cheong et al. ............. | 712/23 |
| 6,061,777 A | * | 5/2000 | Cheong et al. ............. | 712/23 |
| 6,101,597 A | * | 8/2000 | Colwell et al. ............. | 712/218 |
| 6,393,550 B1 | * | 5/2002 | Fetterman et al. ............. | 712/214 |
| 6,463,524 B1 | * | 10/2002 | Delaney et al. ............. | 712/221 |
| 2002/0083304 A1 | * | 6/2002 | Leenstra et al. ............. | 712/218 |
| 2002/0124157 A1 | * | 9/2002 | Le et al. ............. | 712/225 |
| 2003/0208672 A1 | * | 11/2003 | Leenstra et al. ............. | 712/200 |

* cited by examiner

Primary Examiner — Aimee J Li
(74) Attorney, Agent, or Firm — Dillon & Yudell LLP

(57) ABSTRACT

A method and device for adaptively allocating reservation station entries to an instruction set with variable operands in a microprocessor. The device includes logic for determining free reservation station queue positions in a reservation station. The device allocates an issue queue to an instruction and writes the instruction into the issue queue as an issue queue entry. The device reads an operand corresponding to the instruction from a general purpose register and writes the operand into a reservation station using one of the free reservations station positions as a write address. The device writes each reservation station queue position corresponding to said instruction into said issue queue entry. When the instruction is ready for issue to an execution unit, the device reads out the instruction from the issue queue entry the reservation station queue positions to the execution unit.

9 Claims, 2 Drawing Sheets

ADAPTIVE ALLOCATION OF RESERVATION STATION ENTRIES TO AN INSTRUCTION SET WITH VARIABLE OPERANDS IN A MICROPROCESSOR

BACKGROUND OF THE INVENTION

1. Field of the Invention

The present invention relates in general to the field of microprocessors, and in particular to allocation of reservation station entries in a microprocessor.

2. Description of the Related Art

In the issue queue design of today's microprocessors, a reservation station is normally used to store the operands of an instruction along with the opcode. Typically, each issue queue entry contains an instruction opcode and the operands associated with the instruction. For example, for a fixed point instruction containing two operands, each issue queue entry will have two operands included with it. Since each operand can be 64 bits wide, each issue queue entry will need a reservation of 128 bits (i.e., 2×64 bits) to contain the operands. In conventional designs, two operands are reserved in a reservation station for an instruction, even when an instruction (such as a fixed point instruction) may need less than two operands. Typically an issue queue of depth N will need a reservation of depth 2N to support it. For a large issue queue, the number of bits kept in the reservation station can be prohibitively large, and the reservation station can consume a lot of power.

BRIEF SUMMARY OF THE INVENTION

The present invention provides a method and device for adaptively allocating reservation station entries in a microprocessor with an instruction set that provides a variable number of operands. The present invention allows a reduction in number of reservation station entries required to support the issue queue, thus significantly reducing area and power consumption. In one embodiment, the device includes logic for determining free reservation station queue positions in a reservation station. The device allocates an issue queue to an instruction and writes the instruction into the issue queue as an issue queue entry. The device reads an operand corresponding to the instruction from a general purpose register and writes the operand into the reservation station using one of the free reservations station queue positions as a write address. The device writes each reservation station queue position corresponding to the instruction into the issue queue entry. When the instruction is ready for issue to an execution unit, the device reads out the instruction from the issue queue entry and the operands indicated by the reservation station queue positions to the execution unit.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to a method and device for dynamically allocating the number of reservation station entries to an instruction based on the number of operands used by that instruction. At dispatch time, if an instruction requires one operand then only one entry in the reservation station is allocated to this instruction. If an instruction requires two operands, then two entries are allocated to the instruction. However, if an instruction does not need any operands, then no reservation station entry is allocated. Each entry in the issue queue will include the corresponding reservation station position(s) associated with the entry. When an instruction is read out for issue, the reservation station positions are also read out at the same time. The appropriate number of reservation entries can be read out by using the reservation station positions included in the issue queue entry for the instruction. Dynamically allocating reservation station entries in this manner allows the reservation station to be tuned to have a smaller number of entries. Smaller reservation stations will result in significant reduction in silicon area and power usage.

Figure 1:
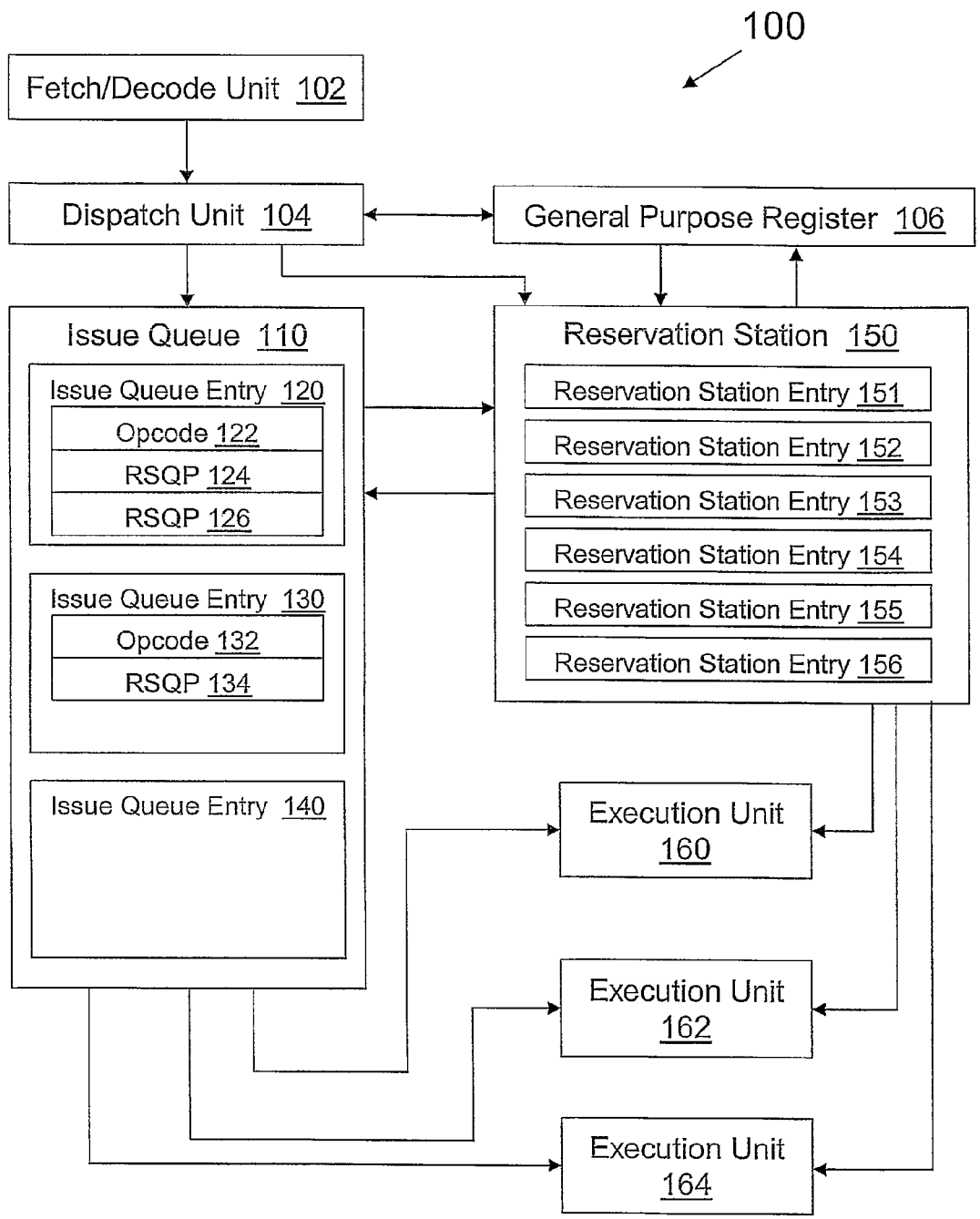
FIG. 1 shows a block diagram of exemplary microprocessor architecture 100 configured for dynamic allocation of reservation station entries.

Referring now to the drawings, wherein like numbers denote like parts throughout the several views, FIG. 1 shows a block diagram of an exemplary microprocessor architecture configured for dynamic allocation of reservation station entries. Fetch/decode unit 102 is coupled to dispatch unit 104. Fetch/decode unit 102 retrieves instructions from the instruction cache and sends the instructions to dispatch unit 104 for out-of-order execution. Dispatch unit 104 is coupled to issue queue 110 and general purpose register 106 ("GPR"). Dispatch unit 104 places decoded instructions in an issue queue while the operands needed to execute the instructions are retrieved from GPR 106. The instruction is stored in the issue queue as an issue queue entry. For instance, an instruction stored in issue queue 110 is stored as issue queue entry 120.

Dispatch unit 104 is also coupled to reservation station 150. Dispatch unit 104 places operands for an instruction held in an issue queue in the reservation station as the operands needed to execute the instruction are retrieved. Storage locations in the reservations stations (reservation station entries 151-156) are referenced by reservation station queue positions 124, 126, 134 ("RSQP"). An RSQP is a pointer to a reservation station entry for an operand associated with an instruction in an entry in the issue queue. For example, the instruction queued in issue queue entry 120 of issue queue 110 requires two operands. Dispatch unit 104 reserves two entries in reservation station 150 (e.g., reservation station entries 151 and 152) while the operands are retrieved from memory. Dispatch unit 104 makes the reservation by placing RSQP 124 and RSQP 126 (which point to reservation station entry 151 and reservation station entry 152, respectively) in issue queue entry 120 (along with opcode 122). However, the instruction in issue queue entry 130 only requires one operand. Dispatch unit 104 reserves only one entry in reservation station 150 (e.g. reservation station entry 153) by placing RSQP 134 in issue queue entry 130 (along with opcode 132). Similarly, the instruction in issue queue entry 140 requires no operands. Dispatch unit 104 does not reserve an entry in reservation station 150. By using RSQPs to point to entries in reservation station 150, reservation station entries can be dynamically allocated to entries in issue queue 110 based upon the number of operands of an instruction, thereby conserving entries in reservation station 150.

Issue queue 110 and reservation station 150 are coupled to respective execution units 160, 162, 164. When the operands needed to execute an instruction held in the issue queue are received in the reservation station, the instruction and its operands are issued to the appropriate execution unit for execution.

The hardware elements depicted in FIG. 1 are not intended to be exhaustive, but rather are representative to highlight essential components required by the present invention. These and other variations are intended to be within the spirit and scope of the present invention.

Figure 2:
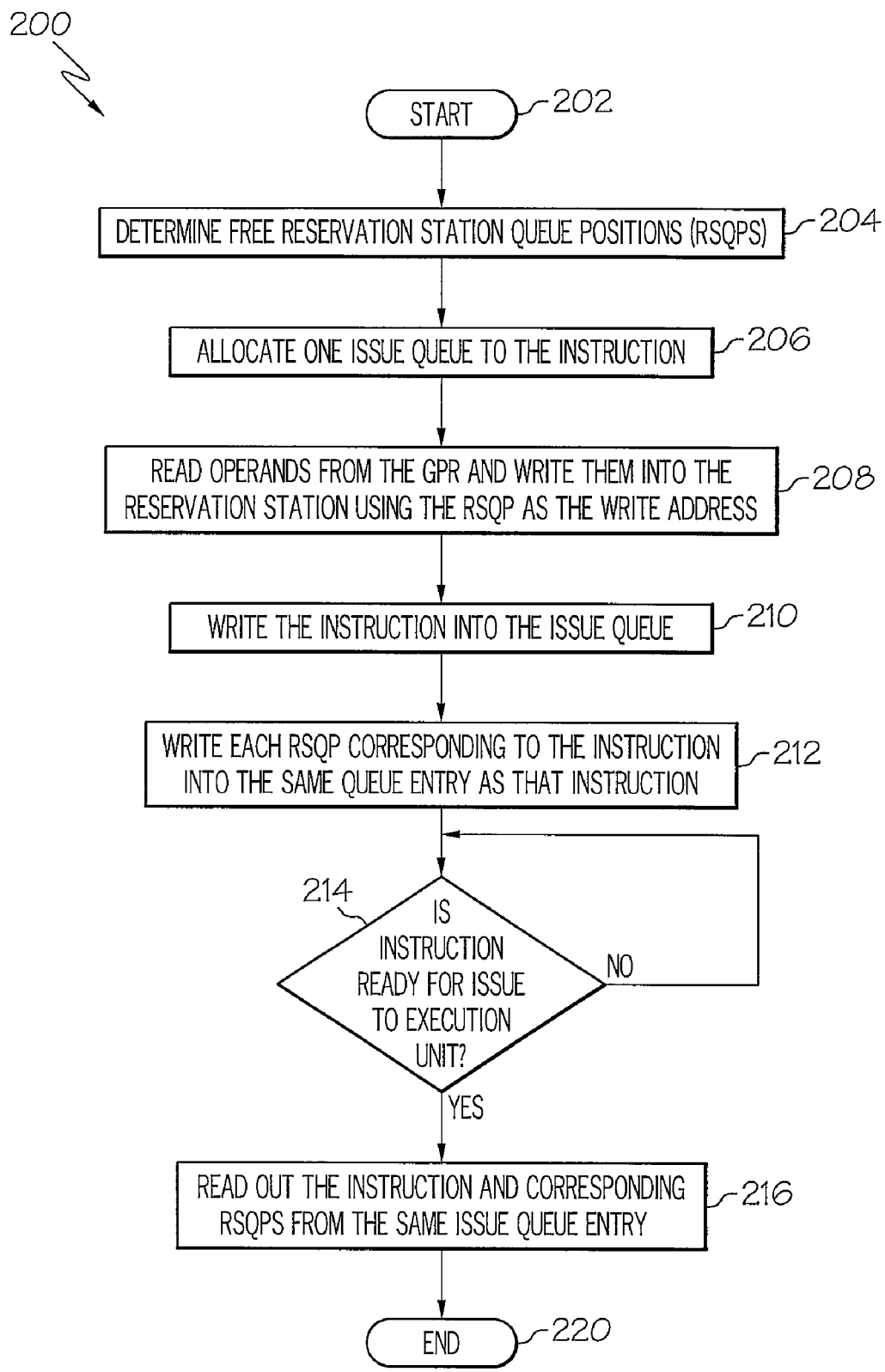
FIG. 2 shows a flowchart 200 that demonstrates an exemplary method for dynamically allocating entries in a reservation station for an instruction in an issue queue.

With reference now to FIG. 2, flowchart 200 demonstrates an exemplary method for dynamically allocating entries in a reservation station for an instruction in an issue queue. The method begins at initiator block 202. Logic within dispatch unit 104 detects which reservation station locations are free and available to allocate to operands dispatched from the dispatch unit to the issue queue (step 204). A free reservation station location is called a reservation station queue position ("RSQP"). Dispatch unit 104 allocates one issue queue per incoming instruction and allocates reservation entries based on the number of operands in the incoming instruction (step 206). If an incoming instruction needs one operand, then only one RSQP is allocated to the instruction. If an incoming instruction requires two operands, then two RSQPs are allocated to the instruction. However, if an incoming instruction doesn't need any operands, then no RSQP is allocated to it. Dispatch unit 104 reads each operand from a general purpose register and writes the operand into the reservation station using an RSQP as the write address (step 208). Logic then writes the instruction into the issue queue (step 210), and also writes the corresponding RSQPs into the same issue queue entry (step 212).

When the instruction is ready for issue (step 214), the instruction is read out from the issue queue and the RSQPs for the instruction are read out from the same issue queue entry (step 216). The RSQPs are used to read out operands from the reservation station and issue them to the execution unit (step 216). The method ends at terminator block 220.

When an instruction is de-allocating from the issue queue, the issue queue entry and the reservation station entries are de-allocated at the same time. When an issue queue is de-allocated, the RSQPs associated with the de-allocating issue queue entry are also read out at this time for de-allocation. The de-allocating RSQPs are sent to the reservation station to return them to the free pool of reservation station locations. The de-allocated issue queue entry and the de-allocated RSQPs are returned to the free pool for new dispatching instructions.

Similarly, when an instruction is flushed-out of the issue queue due to mispredicted branches or an exception is taken, the flushed issue queue entry and the associated reservation stations are de-allocated at the same time. When an issue queue entry is de-allocated, the RSQPs associated with the de-allocating issue queue entry are read out at this time for de-allocation. The de-allocated RSQPs are sent to the reservation station to return them to the free pool.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "logic" or "device" or "system" includes any electronic circuit, or combination thereof, used in a data processing system, including, but not limited to, a microprocessor, microcontroller or component circuit integrated therein.

The flowchart and diagrams in the Figures illustrate the architecture, functionality, and operation of possible implementations of methods, devices and systems according to various embodiments of the present invention. In this regard, each block in the flowchart or diagrams may represent a module, circuit, or portion of a circuit, which comprises one or more functional units for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A method comprising:
   allocating an instruction to an issue queue entry of an issue queue;
   determining unused reservation station entries in a reservation station;
   determining a number of operands needed to execute the instruction;
   in response to determining that one or more operands is needed to execute the instruction, reserving a reservation station entry for each of said one or more operands corresponding to each said issue queue entry by writing a reservation station queue position corresponding to the reservation station entry to the issue queue entry for the instruction;

in response to determining that that no operands are needed to execute the instruction, reserving no entries in the reservation station;

in response to the instruction being ready for issue to an execution unit, reading out to the execution unit the instruction from said issue queue entry, and reading out to the execution unit the reservation station entries corresponding to the reservation station queue positions associated with the issue queue entry.

2. The method of claim 1, in response to said instruction being ready for deallocation from the issue queue, further comprising:

deallocating the issue queue entry from the issue queue;
deallocating entries in the reservation station; and
returning said reservation station queue positions to a pool of unused reservation station queue positions.

3. The method of claim 1, in response to a mispredicted branch, further comprising:

deallocating the issue queue entry from the issue queue;
deallocating entries in the reservation station; and
returning said reservation station queue positions to a pool of unused reservation station queue positions.

4. A device comprising:

logic for allocating an instruction to an issue queue entry of an issue queue;

logic for determining unused reservation station entries in a reservation station;

logic for determining a number of operands needed to execute the instruction;

logic, responsive to determining that one or more operands is needed to execute the instruction, for reserving a reservation station entry for each of said one or more operands corresponding to each said issue queue entry by writing a reservation station queue position corresponding to the reservation station entry to the issue queue entry for the instruction;

logic, responsive to determining that no operands are needed to execute the instruction, for reserving no entries in the reservation station;

logic, responsive to the instruction being ready for issue to an execution unit, for:

reading out to the execution unit the instruction from said issue queue entry, and reading out to the execution unit the reservation station entries corresponding to the reservation station queue positions associated with the issue queue entry.

5. The device of claim 4, further comprising logic, responsive to said instruction being ready for deallocation from the issue queue, for:

deallocating the issue queue entry from the issue queue;
deallocating entries in the reservation station; and
returning said reservation station queue positions to a pool of unused reservation station queue positions.

6. The device of claim 4, further comprising logic, responsive to a mispredicted branch, for:

de-allocating the issue queue entry from the issue queue;
deallocating entries in the reservation station; and
returning said reservation station queue positions to a pool of unused reservation station queue positions.

7. A data processing system comprising:

a memory;

at least one processor coupled to said memory and having:

logic for allocating an instruction to an issue queue entry of an issue queue;

logic for determining unused reservation station entries in a reservation station;

logic for determining a number of operands needed to execute the instruction;

logic, responsive to determining that one or more operands is needed to execute the instruction, for reserving a reservation station entry for each of said one or more operands corresponding to each said issue queue entry by writing a reservation station queue position corresponding to the reservation station entry to the issue queue entry for the instruction;

logic, responsive to determining that no operands are needed to execute the instruction, for reserving no entries in the reservation station;

logic, responsive to the instruction being ready for issue to an execution unit, for:

reading out to the execution unit the instruction from said issue queue entry, and reading out to the execution unit the reservation station entries corresponding to the reservation station queue positions associated with the issue queue entry.

8. The data processing system of claim 7, said at least one processor having logic, responsive to said instruction being ready for deallocation from the issue queue, for:

deallocating the issue queue entry from the issue queue;
deallocating entries in the reservation station; and
returning said reservation station queue positions to a pool of unused reservation station queue positions.

9. The data processing system of claim 7, said at least one processor having logic, responsive to a mispredicted branch, for:

de-allocating the issue queue entry from the issue queue;
deallocating entries in the reservation station; and
returning said reservation station queue positions to a pool of unused reservation station queue positions.

* * * * *